United States Patent [19]

Moriya

[11] 4,391,350
[45] Jul. 5, 1983

[54] STRUCTURE FOR MOUNTING A BRAKE PAD ABRASION DETECTOR

[75] Inventor: Michio Moriya, Hyogo, Japan

[73] Assignee: Sumitomo Electric Industries, Ltd., Osaka, Japan

[21] Appl. No.: 933,941

[22] Filed: Aug. 15, 1978

[30] Foreign Application Priority Data

Sep. 20, 1977 [JP] Japan .................... 52-127282[U]

[51] Int. Cl.³ .............................................. F16D 66/02
[52] U.S. Cl. ...................................... 188/1.11; 16/38; 116/208; 340/52 A; 403/348
[58] Field of Search ............... 188/1.11; 340/52 A; 116/208; 16/38, 39; 403/348

[56] References Cited

U.S. PATENT DOCUMENTS

| 568,023 | 9/1896 | Gamble | 16/38 |
| 1,559,699 | 11/1925 | Herold | 16/38 |
| 2,146,357 | 2/1939 | Schweikle | 188/1 A |
| 4,005,766 | 2/1977 | Kennel | 188/1 A |
| 4,016,533 | 4/1977 | Ishikawa et al. | 188/1 A |

Primary Examiner—George E. A. Halvosa
Attorney, Agent, or Firm—Sughrue, Mion, Zinn, Macpeak and Seas

[57] ABSTRACT

An easily insertable and removable brake pad abrasion detector is provided by forming a recess in the rear surface of the pad, a hole in the pad backing plate communicating with the recess, a sleeve in the hole having inwardly projecting one-way pawls and a probe having a circumferential shoulder engaged by the pawls when inserted. The small diameter part of the probe may have an elliptical cross-section so that the pawls may be disengaged by merely turning the probe.

10 Claims, 9 Drawing Figures

STRUCTURE FOR MOUNTING A BRAKE PAD ABRASION DETECTOR

BACKGROUND OF THE INVENTION

This invention relates to structures for mounting a brake pad abrasion detector.

The insertion of a detector (or a so-called probe) at the pad abrasion limit position has been employed in order to detect the abrasion of a brake pad or a lining for many years. There have been proposed a variety of probe mounting structures.

However, among the conventional probe mounting structures, only a few structures permit the simple mounting of the probe as required. For instance, a structure is available in which a threaded hole is formed in the backing plate or in the probe holding member, and the probe is screwed into the threaded hole. However, this conventional structure is disadvantageous in that the machining is rather troublesome, and the probe is liable to be displaced owing to the vibration. In order to prevent the displacement of the probe, it is necessary to provide a special stopper.

SUMMARY OF THE INVENTION

Accordingly, an object of this invention is to provide a mounting structure which is simple in construction, and with which a probe can be readily mounted when required.

Another object of the invention is to provide a mounting structure with which a probe can be removed if required.

These and other objects are achieved according to the present invention by providing a sleeve holding member having inwardly biased projections in a through hole in the pad backing plate which communicates with a blind hole in the rear surface of the pad. The probe is provided with a shoulder that is engaged by the projections when inserted into the holding member. The shoulder may be formed at the junction of two different diameter sections or by providing flat surfaces on the sides of the lower portion. In the former case, it is possible to form the smaller diameter portion with an elliptical cross-section having a major axis at least as long as the larger diameter portion so that the projections may be disengaged by rotating the probe, thus facilitating removal. In such a case, a variety of techniques are illustrated for preventing interference between the projections and through hole when the probe is rotated.

BRIEF DESCRIPTION OF THE DRAWINGS

This invention will now be described with reference to the drawings, in which.

DETAILED DESCRIPTION OF THE INVENTION

Figure 1:
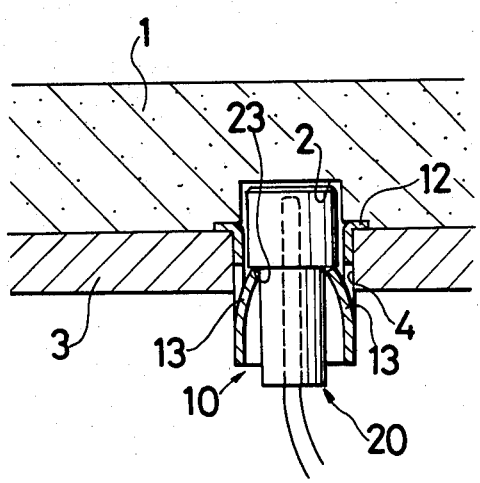
FIG. 1 is a sectional view showing a mounting structure according to this invention.

As shown in FIG. 1, a blind hole 2 is formed in a brake pad 1. A through hole 4 communicating with the blind hole 2 is formed in a backing plate 3. A probe holding member 10 is inserted into the holes 4 and 2 and a probe 20 is held by the probe holding member 10.

Figure 2:
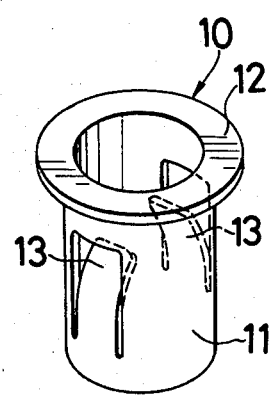
FIG. 2 is a perspective view showing a probe holding member.

As shown in FIG. 2, the probe holding member 10 comprises a cylinder 11 made of an elastic material, and a flange 12 provided on the top of the cylinder 11. A pair of opposite no-return pawls 13 are formed in the wall of the cylinder 11 in the axial direction. Each of the no-return pawls 13 is inclined toward the central axis of the cylinder and the elasticity of the material gives a no-return effect to the pawls.

In order to fixedly secure the probe holding member 10 to the brake pad, during the manufacture of the brake pad the holding member 10 is inserted into the through hole 4 of the backing plate 3 in advance, and then the pad 1 is molded under pressure onto the backing plate so that the pad and backing plate form one unit. As a result, the flange 12 of the holding member 10 is held between the pad 1 and the plate 3 as shown in FIG. 1.

Figure 3:
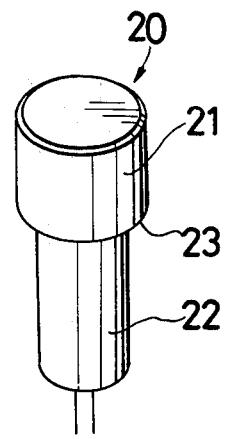
FIG. 3 is a perspective view showing one example of a probe which may be used in the present invention.

The aforementioned probe 20 is made up of a head section 21 and a leg section 22 as shown in FIG. 3. A shoulder 23 is formed between the two sections 21 and 22. If the probe 20 is inserted into the holding member 10 in such a manner that the head section 21 is first inserted therein, the no-return pawls 13 and 13 are engaged with the shoulder 23 of the probe to fixedly hold the latter, as shown in FIG. 1.

Figure 4:
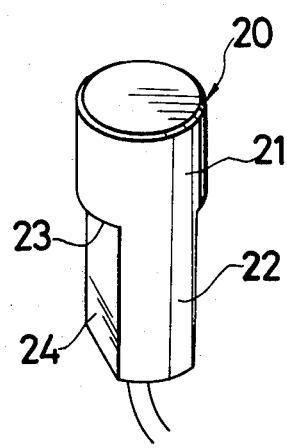
FIG. 4 is a perspective view showing a second example of a probe which may be used in the present invention.

In the probe shown in FIG. 3, the shoulder 23 of the probe 20 is formed by making the diameter of the leg section smaller than that of the head section 21, and accordingly the shoulder 23 is provided along the entire circumference of the probe 20. However, a shoulder may be formed by providing flat surfaces 24 in the leg section 22 in the axial direction as is shown in FIG. 4. In this case, as the substantially flat ends of the no-return pawls 13 are abutted against the flat surfaces 24, it is also possible to prevent the rotation of the probe 20.

Figure 5:
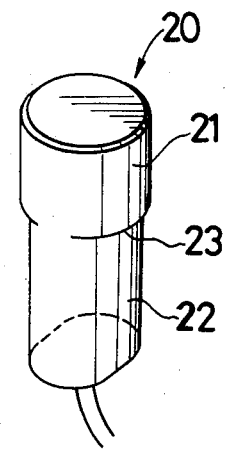
FIG. 5 is a perspective view showing a third example of a probe which may be used in the present invention.
Figure 6:
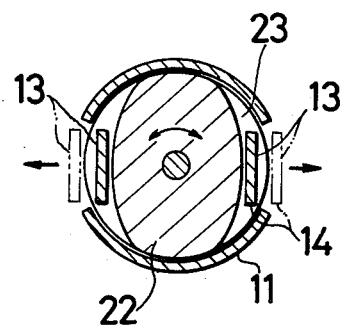
FIG. 6 is a cross-sectional diagrammatic view showing the probe illustrated in FIG. 5 mounted in a probe holding member.

Furthermore, if the leg section 22 of the probe 22 is formed in such a manner that its section is elliptic and its major axis is equal to the diameter of the head section 21 as shown in FIGS. 5 and 6, then after the probe 20 is inserted into the holding member 10 and is affixed to the pad assembly, it can be removed therefrom. More specifically, under the condition that, as shown in FIG. 6, the shoulders 23 of the probe are engaged with the no-return pawls 13 of the holding member, the probe is turned. Then, since the section of the leg section 22 of the probe is elliptic as was described above, the pawls 13 are gradually pushed outwards. Finally, the distance between the pawls 13 is increased to the diameter of the head section 21 by the major axis as indicated by the chain line in FIG. 6, and therefore the probe can be removed from the holding member 10 merely by pulling it.

Figure 7:
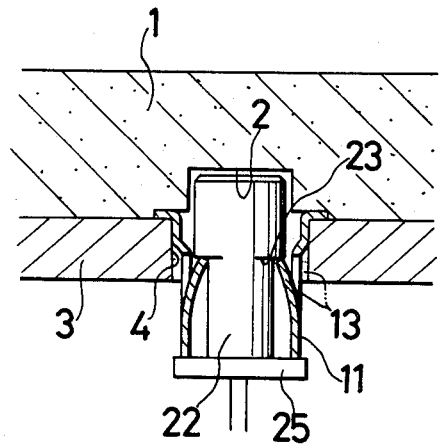
FIG. 7 is a sectional view showing a second example of a mounting structure which may be used in the present invention.
Figure 8:
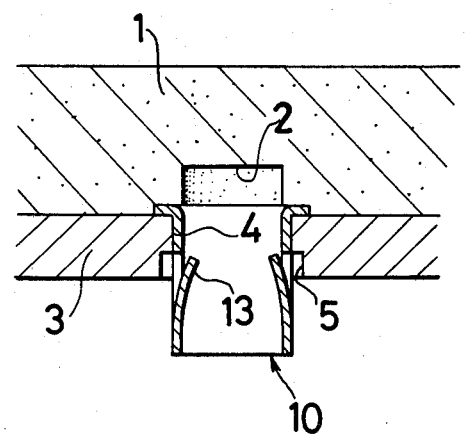
FIG. 8 is a sectional view showing a third example of a mounting structure which may be used in the present invention.
Figure 9:
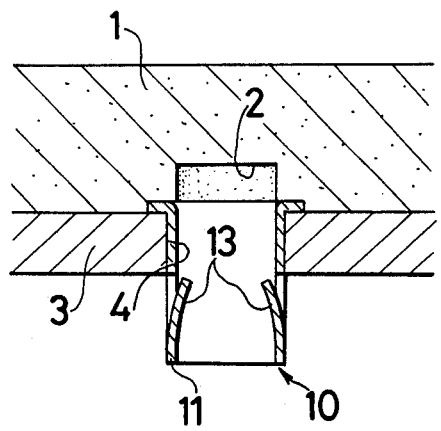
FIG. 9 is a sectional view showing a fourth example of a mounting structure which may be used in the present invention.

In this case it should be noted that, if the no-return pawl 13 is flat, its both edges are positioned outside the cylinder 11 of the holding member. However, if the diameter of the through hole 4 of the backing plate 3 is made equal to the outside diameter of the cylinder 11 as in the case of FIG. 1, then it is impossible to further move the no-return pawls 13 apart from each other because the movement is obstructed by the through hole 4. In order to eliminate this difficulty, the following method may be employed. That is, as shown in FIG. 7, the diameter of the lower portion, from the vicinity of the no-return pawls 13 to the lower end, of the cylinder 11 of the holding member 10 is made smaller so that there is provided a gap between the lower portion and the through hole 4 of the backing plate 3. Alternatively, a recess 5 may be provided along the peripheral portion of the end of the through hole 4 as shown in FIG. 8, or the holding member may be so designed that the no-return pawls 13 are exposed outside the through hole 4 as shown in FIG. 9. Furthermore, it is apparent that the holding member 10 as described above may be applied to the probes shown in FIGS. 3 and 4.

In addition, a collar 25 may be provided on the end of the leg section of the probe as shown in FIG. 7. In this case, as the vertical movement of the probe is positively prevented and it is possible to fixedly secure the probe in the pad assembly. It is obvious that such a collar may be also provided for the probe shown in FIGS. 3 or 4.

According to this invention, the probe can be fixedly secured merely by depressing it. Accordingly, the abrasion detector can be mounted on the brake assembly at any time when required, and in this case the probe can be held in place with the simple structure.

When the detector becomes out of order, it can be readily removed for replacement. Thus, the present invention has a variety of merits.

What is claimed is:

1. A structure for mounting an electrical brake pad abrasion detector, of the type in which a through hole is formed in a backing plate in such a manner as to communicate with a blind hole formed in a brake pad, wherein the improvement comprises:
a cylindrical holding member fixedly secured in said through hole, said holding member having at least one no-return pawl provided on the inner periphery thereof, said pawl having an end disposed within said cylindrical holding member;
a substantially cylindrical probe having head and leg sections meeting to form a shoulder at the intermediate portion of said probe, said probe being inserted into said holding member so as to allow the end of said at least one no-return pawl to engage with said shoulder to thereby hold said probe; and
the diameter of a portion of said holding member, extending from the vicinity of the end of said at least one no-return pawl to one end of said holding member adjacent said head section, being made larger than that of a remaining portion thereof.

2. A structure for mounting a brake pad abrasion detector as claimed in claim 1, characterized in that said shoulder is formed by making the leg section of said probe smaller in diameter than the head section of said probe.

3. A structure for mounting a brake pad abrasion detector as claimed in claim 1, characterized in that said shoulder is formed by providing flat surfaces on both sides of said leg section of said probe.

4. A structure for mounting a brake pad abrasion detector as claimed in claim 1, characterized in that said shoulder is obtained by forming said leg section of said probe in such a manner that the cross-section of said leg section is elliptic and the length of the major axis of said elliptic cross-section is equal to the diameter of said head section of said probe.

5. A structure for mounting a brake pad abrasion detector as claimed in claim 1, characterized in that said probe has a collar at the lower end thereof for abutting the lower end of said holding member when said shoulder is engaged.

6. A structure for mounting an electrical brake pad abrasion detector, of the type in which a through hole is formed in a backing plate in such a manner as to communicate with a blind hole formed in a brake pad, wherein the improvement comprises:
a cylindrical holding member fixedly secured in said through hole, said holding member having at least one no-return pawl provided on the inner periphery thereof, said pawl having an end disposed within said cylindrical holding member, a recess being provided along the peripheral portion of the end of said through hole adjacent said at least one no-return pawl;
a substantially cylindrical probe having head and leg sections meeting to form a shoulder at the intermediate portion of said probe, said probe being inserted into said holding member so as to allow the end of said at least one no-return pawl to engage with said shoulder to thereby hold said probe.

7. A structure for mounting a brake pad abrasion detector as claimed in claim 6 characterized in that said shoulder is formed by making the leg section of said probe smaller in diameter than the head section of said probe.

8. A structure for mounting a brake pad abrasion detector as claimed in claim 6 characterized in that said shoulder is formed by providing flat surfaces on both sides of said leg section of said probe.

9. A structure for mounting a brake pad abrasion detector as claimed in claim 6 characterized in that said shoulder is obtained by forming said leg section of said probe in such a manner that the cross-section of said leg section is elliptic and the length of the major axis of said elliptic cross-section is equal to the diameter of said head section of said probe.

10. A structure for mounting a brake pad abrasion detector as claimed in claim 6, characterized in that said probe has a collar at the lower end thereof for abutting the lower end of said holding member when said shoulder is engaged.

* * * * *